Nov. 3, 1959     C. W. SINCLAIR ET AL     2,911,028
WHEEL RIM
Filed May 28, 1956
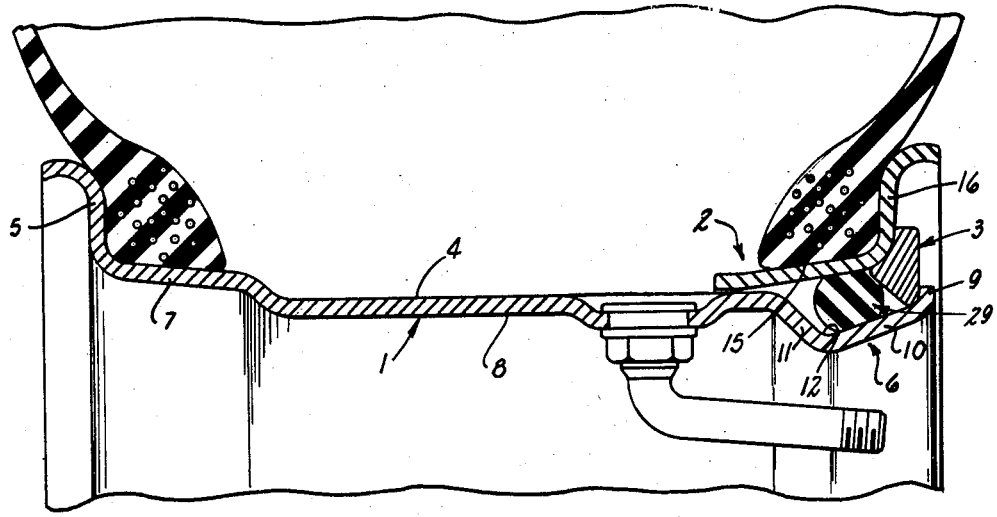
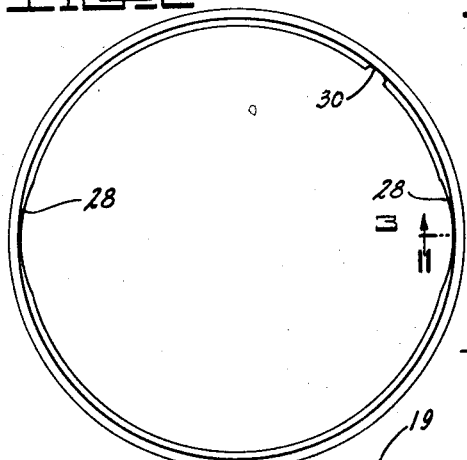
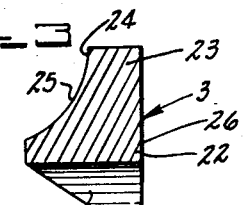
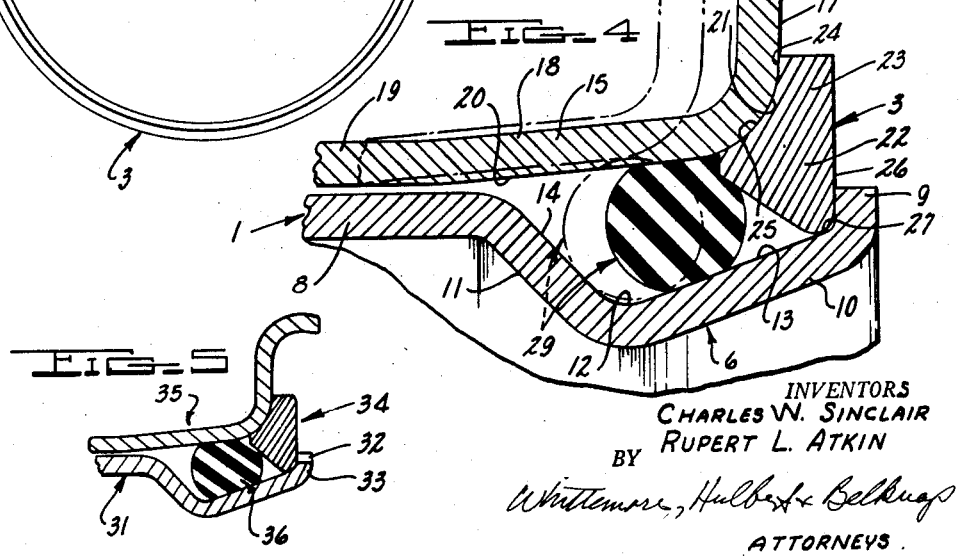
INVENTORS
CHARLES W. SINCLAIR
RUPERT L. ATKIN
BY
Whittemore, Hulbert & Belknap
ATTORNEYS.

United States Patent Office 2,911,028
Patented Nov. 3, 1959

2,911,028
WHEEL RIM

Charles W. Sinclair, Detroit, and Rupert L. Atkin, Grosse Pointe Woods, Mich., assignors to Kelsey-Hayes Company, a corporation of Delaware Application May 28, 1956, Serial No. 587,791

5 Claims. (Cl. 152—409)

This invention relates to rims and refers more particularly to rims for pneumatic tubeless tires.

The invention has for an object to provide an improved rim constructed to facilitate mounting and demounting the tubeless tire and to maintain air pressure.

The invention has for other objects to provide an improved rim comprising an annular base member, an annular tire retaining member and a sealing member between the base member and tire retaining member for preventing the escape of air therebetween; and to provide an endless annular clamping member for positively limiting axial movement in one direction of the tire retaining member relative to the base member and also serving to retain the sealing member without pinching or otherwise damaging it.

These and other objects of the invention will become apparent from the following description taken in connection with the accompanying drawings in which:

Figure 1 is an axial section through a portion of a rim embodying the invention;

Figure 2 is an elevational view of the clamping member;

Figure 3 is a cross-section on the line 3—3 of Figure 2;

Figure 4 is an enlarged view of a portion of Figure 1;

Figure 5 is a view similar to Figure 4 showing a portion of a modified rim.

The rim is designed for use with pneumatic tubeless tires and is adapted to form part of a motor vehicle wheel. In general, the rim comprises the annular base member 1, the detachable annular tire retaining member 2, and the detachable annular clamping member 3 for retaining the tire retaining member on the base member.

The base member is endless and has the annular base 4, the annular tire retaining flange 5 extending generally radially outwardly from one edge of the base and the annular gutter 6 at the other edge of the base. The base 4 is formed with the annular tire bead seat portion 7 flared toward and connecting into the tire retaining flange 5, and the axially extending annular portion 8 leading from the bead seat portion. The gutter 6 has the axially outer radially outwardly extending terminal wall 9 which has an external diameter preferably less than the external diameter of the annular portion 8, the axially and radially outwardly inclined bottom wall 10 connecting into the terminal wall 9, and the radially outwardly and axially inwardly inclined wall 11 which connects into the axially extending portion 8. The gutter 6 has an annular radially outwardly facing well 12 formed by reason of the bottom wall 10 being inclined radially and axially outwardly, and the well is defined by the radially and axially outwardly inclined radially outer surface 13 of the bottom wall and the radially outwardly and axially inwardly inclined radially outer surface 14 of the inclined wall 11.

The detachable annular tire retaining member 2 is endless and is movable over the terminal wall 9. The tire retaining member has the tire bead seat portion 15 and the integral tire retaining flange 16 extending generally radially outwardly from the axially outer edge of the tire bead seat portion and provided with a substantially radial axially outer surface 17. The tire bead seat portion 15 is formed with the part 18 inclined axially and radially outwardly at an angle less than the bottom wall 10 and connecting into the tire retaining flange 16, and is also formed with the axially extending part 19 of a diameter to clear the annular portion 8. The part 18 has the radially inner surface 20 inclined axially and radially outwardly at an angle less than the radially outer surface 13 of the bottom wall of the gutter. The radially inner surface 20 is connected to the axially outer surface 17 by a rounded convex surface 21.

The detachable annular clamping member is endless and is formed of a resilient metal having a body portion 22 and the flange portion 23. The flange portion 23 has a substantially radially extending axially inner surface 24 and the body portion 22 has a concave rounded surface 25 connecting into the axially inner surface 24 of the flange portion and having the same curvature as the rounded surface 21, and a radially extending axially outer surface 26 connecting into a radially inner surface 27 inclined radially and axially outwardly at the same angle as the surface 13 of the bottom wall 10. In the final or completely assembled position of the rim members, the body portion 22 extends between the gutter 6 and the tire retaining member 2 and centers the tire retaining member 2 relative to the base member 1, the radially inner surface 27 engaging the surface 13 of the bottom wall 10 of the gutter, the axially outer surface 26 engaging the radially extending axially inner surface of the terminal wall 9 and the concave surface 25 engaging the convex surface 21. The axially inner surface 24 of the clamping member engages the axially outer surface 17 of the tire retaining member. The minimum and maximum distances between the surfaces 25 and 27 of the clamping member are normally greater before assembly of the rim members than the minimum and maximum distances respectively between the convex surface 21 and the portion of the surface 13 of the bottom wall 10 engaged by surface 27. Therefore, during assembly of the base, tire retaining and clamping members, the clamping member has wedging engagement with the tire retaining member and is contracted against the bottom wall of the gutter and flexes either or both the base and tire retaining members. The clamping member 3 has diametrically opposite clearances 28 in its radially inner edge. The inside diameter of the clamping member is slightly greater than the distance from the bottom of the well 12 to the radially outer edge of the terminal wall 9 at the diametrically opposite side of the rim.

The beads of the tubeless tire firmly engage the tire bead seat portion 7 and the part 18 of the tire bead seat portion 15 to prevent the escape of air along these tire bead seat portions.

To seal the gap between the base member 1 and the tire retaining member 2, we have provided the annular sealing member 29 in the annular space formed by the gutter 6, the tire retaining member 2 and the clamping member 3. The sealing member is an endless resilient stretchable strip of deformable material, such as rubber, and preferably but not necessarily being of circular cross-section. Before the tire is inflated, the tire retaining member 2 and sealing member 29 are in the dotted line position of Figure 4, and the cross-sectional dimension of the sealing member is such that it is deformed and makes sealing contact with the surface 13 of the bottom wall 10 and the radially inner surface 20 of the tire retaining member and also is deformed and makes sealing contact with the surface 14 of wall 11, to prevent the escape of air while the tire is being inflated. In the final position of the rim members shown in full lines in Figure 4, the sealing member is deformed and wedged more firmly between the surfaces 13 and 20 and forms a more effective seal for the gap between the base and tire retaining members.

The tubeless tire may be readily mounted on the rim while the tire retaining member 2, the clamping member 3 and the sealing member 29 are removed. The tire retaining member may then be moved over the base member and inserted within the axially outer bead of the tubeless tire at which time the beads of the tubeless tire tightly fit the tire bead seat portions 7 and 15 of the base and tire retaining members respectively so that air cannot escape between the beads and bead seat portions. When the tire retaining member 2 is in an axially inward position to clear the clamping member 3, the clamping member is buttoned on the base member in position in the gutter 6 by placing a portion of the clamping member between the clearances 28 in the well 12 at one side of the base member, and the clamping member is distorted to expand the diametrically opposite portion thereof over the radially outer edge of the terminal wall 9 at the diametrically opposite side of the base member. The clearances 28 facilitate buttoning on of the clamping member. When the clamping member is fully located within the gutter and abutting the terminal wall 9, the sealing member 29 is expanded over the clamping member 3 and positioned in the well of the gutter. The tire retaining member 2 and the adjacent portion of the side wall of the tire may then be allowed to move axially outwardly or manually moved axially outwardly to occupy a preliminary inflatable position of assembly shown in dotted lines in Figure 4, at which time the sealing member 29 is deformed into sealing engagement with the surface 20 of the tire retaining member and the surfaces 13 and 14 of the walls 10 and 11 of the gutter to seal the gap therebetween. The tire may then be inflated at which time the inflating air acting through the tire against the tire retaining member 2 assures engagement of the clamping member with the terminal wall of the gutter and moves the tire retaining member to its axially outer position over the clamping member shown in full lines in Figure 4. During this axially outward movement, the surface 20 of the tire retaining member acts upon the sealing member to move it to the full line position of Figure 4 and to deform the same into more firm sealing engagement with the surface 20 and the surface 13 of the bottom wall of the gutter and also into firm sealing engagement with the clamping member 3. Since the clamping member is endless rather than split, it will not pinch or otherwise damage the sealing member. The clamping member 3 has a notch 30 in its radially inner edge to facilitate its removal from the base member through insertion of a screwdriver, tire iron, or like instrument into prying engagement, etc.

In the modification illustrated in Figure 5, the endless base member 31 differs essentially from the base member 1 in that diametrically opposite clearances 32 are provided in the radially outer edge of the terminal wall 33. These clearances facilitate buttoning on of the endless clamping member 34 which differs essentially from the clamping member 3 in that no clearances are provided in its radially inner edge. The endless tire retaining member 35 is the same as the tire retaining member 2, and the endless sealing member 36 is the same as the sealing member 29 and is constructed to seal the gap between the base and tire retaining members during initial assembly of the rim members and to be deformed and more firmly engage the rim members and more effectively seal the gap in the final position of assembly of the rim members.

What we claim as our invention is:

1. A rim for a tubeless tire comprising an endless annular base member having an annular gutter at one edge formed with a radially outwardly extending terminal wall and a bottom wall radially outwardly inclined toward said terminal wall, a detachable endless tire retaining member movable over said terminal wall and encircling said base member and having a generally radially outwardly extending tire retaining flange and a tire bead seat portion radially outwardly inclined toward said flange at an angle smaller than that made by said bottom wall, said bead seat portion encircling said bottom wall, an endless clamping member extending within said gutter and abutting said terminal wall and tire retaining member to limit axially outward movement of the latter, and an endless deformable sealing member located in said gutter at the axially inner side of said clamping member in position to engage the latter and wedged between and making sealing contact with said bottom wall and said tire bead seat portion, said sealing member being sufficiently stretchable to be expanded over said clamping member for positioning in said gutter at the axially inner side of said clamping member following positioning of the latter in said gutter, and said tire retaining member being movable axially inwardly away from said clamping member far enough to permit the positioning of said sealing member in said gutter by expansion over said clamping member as aforesaid.

2. A rim as in claim 1 in which said clamping member is resilient and has substantially diametrically opposite clearances at its radially inner edge to facilitate buttoning on of said clamping member and said bottom wall provides a well at the axially inner extremity thereof for receiving a side of said clamping member during the buttoning on of the latter.

3. A rim as in claim 1 in which said clamping member is resilient and said terminal wall has substantially diametrically opposite clearances in its radially outer edge to facilitate buttoning on of said clamping member and said bottom wall provides a well at the axially inner extremity thereof for receiving a side of said clamping member during the buttoning on of the latter.

4. A rim for a tubeless tire comprising an endless annular base member having an annular gutter at one edge formed with a radially outwardly extending terminal wall and a bottom wall flared toward said terminal wall, an endless tire retaining member movable over said terminal wall and having a generally radially outwardly extending tire retaining flange and a tire bead seat portion flared toward said flange at an angle less than that of said bottom wall and encircling said bottom wall in the axially outer operative postion of said tire retaining member, an endless clamping member within said gutter and abutting said terminal wall and flange to determine the axially outer operative position of said tire retaining member and center said tire retaining member relative to said base member when said tire retaining member is in its axially outer operative position, and an endless resilient stretchable sealing member of deformable material located in said gutter at the axially inner side of said clamping member in the space between said bottom wall and tire bead seat portion and clamping member, said sealing member normally having a circular cross-section and making sealing contact with said bottom wall and tire bead seat portion in the preliminary inflatable position of said tire retaining member in which it is spaced axially inwardly from said operative position, said sealing member being movable axially outwardly toward and into engagement with said clamping member at least in part by said tire bead seat portion of said tire retaining member during movement of the latter from its preliminary inflatable position to its operative position when the tubeless tire is inflated and having wedging engagement with and making more firm sealing contact with said bottom wall and tire bead seat portion, said sealing member being sufficiently stretchable to be expanded over said clamping member for positioning in said gutter at the axially inner side of said clamping member following positioning of the latter in said gutter, and said tire retaining member being movable axially inwardly away from said clamping member far enough to permit the positioning of said sealing member in said gutter by expansion over said clamping member as aforesaid.

5. A rim for a tubeless tire comprising an endless annular base member having an annular gutter at one edge formed with a radially outwardly extending terminal wall and a bottom wall flared toward said terminal wall, an endless tire retaining member movable over said terminal wall and having a generally radially outwardly extending tire retaining flange and a tire bead seat portion flared toward said flange at an angle less than that of said bottom wall and encircling said bottom wall in the axially outer operative position of said tire retaining member, an endless clamping member within said gutter and abutting said terminal wall and flange to determine the axially outer operative position of said tire retaining member and center said tire retaining member relative to said base member when said tire retaining member is in its axially outer operative position, and an endless resilient stretchable sealing member of deformable material located in said gutter at the axially inner side of said clamping member in the space between said bottom wall and tire bead seat portion and clamping member, said sealing member normally having a circular cross-section and making sealing contact with said bottom wall and tire bead seat portion in the preliminary inflatable position of said tire retaining member in which it is spaced axially inwardly from said operative position, said sealing member being subject to the pressure of the air in the tubeless tire and being movable axially outwardly toward and into sealing engagement with said clamping member in part by said pressure of the air and in part by said tire bead seat portion of said tire retaining member during movement of the latter from its preliminary inflatable position to its operative position when the tubeless tire is inflated and having wedging engagement with and making more firm sealing contact with said bottom wall and tire bead seat portion, said sealing member being sufficiently stretchable to be expanded over said clamping member for positioning in said gutter at the axially inner side of said clamping member following positioning of the latter in said gutter, and said tire retaining member being movable axially inwardly away from said clamping member far enough to permit the positioning of said sealing member in said gutter by expansion over said clamping member as aforesaid, said clamping member being resilient and having substantially diametrically opposite clearances in its radially inner edge to facilitate buttoning on of said clamping member, and said bottom wall providing a well at the axially inner extremity thereof for receiving a side of said clamping member during the buttoning on of the latter.

References Cited in the file of this patent

UNITED STATES PATENTS

| | | |
|---|---|---|
| 969,779 | Gammeter | Sept. 13, 1910 |
| 2,685,907 | Waddell | Aug. 10, 1954 |
| 2,808,870 | Riggs | Oct. 8, 1957 |

FOREIGN PATENTS

| | | |
|---|---|---|
| 446,258 | Great Britain | Apr. 21, 1936 |
| (Corresponding U.S. Patent 2,174,616, Oct. 3, 1939) | | |
| 725,767 | Great Britain | Mar. 9, 1955 |